United States Patent
Wong et al.

(10) Patent No.: US 11,140,560 B2
(45) Date of Patent: *Oct. 5, 2021

(54) OVERLAY OF MILLIMETER WAVE (MMWAVE) ON CITIZENS BROADBAND RADIO SERVICE (CBRS) FOR NEXT GENERATION FIXED WIRELESS (NGFW) DEPLOYMENT

(71) Applicant: AT&T Intellectual Property I, L.P., Atlanta, GA (US)

(72) Inventors: Tony Wah-Tung Wong, Dallas, TX (US); Spyridon Kapoulas, New York, NY (US); Rajeev Jayaram, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,833

(22) Filed: May 8, 2020

(65) Prior Publication Data
US 2020/0267566 A1    Aug. 20, 2020

Related U.S. Application Data

(63) Continuation of application No. 16/532,561, filed on Aug. 6, 2019, now Pat. No. 10,694,395, which is a
(Continued)

(51) Int. Cl.
*H04W 72/00* (2009.01)
*H04W 16/14* (2009.01)
(Continued)

(52) U.S. Cl.
CPC ......... *H04W 16/14* (2013.01); *H04L 41/0806* (2013.01); *H04L 41/5019* (2013.01);
(Continued)

(58) Field of Classification Search
CPC ... H04W 16/14; H04W 16/26; H04W 72/085; H04W 92/20; H04L 41/5019
(Continued)

(56) References Cited

U.S. PATENT DOCUMENTS

| | | |
|---|---|---|
| 6,560,459 B1 | 5/2003 | Wong |
| 6,873,597 B1 | 3/2005 | King |

(Continued)

FOREIGN PATENT DOCUMENTS

| | | |
|---|---|---|
| CN | 101309204 B | 2/2015 |
| WO | 2012/075347 A1 | 6/2012 |

(Continued)

OTHER PUBLICATIONS

Zhang et al., "Heterogeneous Statistical QoS Provisioning over 5G Mobile Wireless Networks", IEEE Network URL: http://www.ece.tamu.edu/~xizhang/papers/IEEE_Network_Journal_5G_Xi_Zhang.pdf, vol. 28, No. 6, Nov.-Dec. 2014, pp. 46-53.

(Continued)

*Primary Examiner* — Marceau Milord
(74) *Attorney, Agent, or Firm* — Amin, Turocy & Watson, LLP

(57) ABSTRACT

An overlay of millimeter wave (mmWave)-capable cells are added to a citizens broadband radio service (CBRS) network to provide coverage in a next generation fixed wireless (NGFW) network. The availability of mmWave spectrum, with limited reach, can be utilized as a wireless backhaul for subsequent hops. In one aspect, integrated access front-haul nodes (IAFHNs) that are utilized for mmWave transmissions at a second (and/or subsequent) hop can be deployed with self-aligning receivers. Further, the IAFHNs can facilitate adaptive resource allocation scheduling in an integrated access and backhaul (IAB) chain. In addition, an interface between macro access points can be enhanced to enable the
(Continued)

adaptive resource allocation on the IAB chain. In one aspect, a fixed user equipment (UE) can be configured with dual connectivity (DC) and a network operator can offer different tiers of services based on a location of the UE.

20 Claims, 14 Drawing Sheets

Related U.S. Application Data continuation of application No. 16/010,332, filed on Jun. 15, 2018, now Pat. No. 10,419,943.

(51) Int. Cl.
*H04W 16/26* (2009.01)
*H04W 72/08* (2009.01)
*H04L 12/24* (2006.01)
*H04L 12/26* (2006.01)
*H04W 92/20* (2009.01)

(52) U.S. Cl.
CPC ...... *H04L 41/5054* (2013.01); *H04L 43/0876* (2013.01); *H04W 16/26* (2013.01); *H04W 72/085* (2013.01); *H04W 92/20* (2013.01)

(58) Field of Classification Search
USPC ... 455/454, 11.1, 443, 447, 453, 450, 452.1, 455/62, 63.1, 464
See application file for complete search history.

(56) References Cited

U.S. PATENT DOCUMENTS

| | | |
|---|---|---|
| 7,313,402 B1 | 12/2007 | Rahman |
| 7,463,600 B2 | 12/2008 | Tong et al. |
| 7,743,002 B2 | 6/2010 | Hernandez |
| 7,801,783 B2 | 9/2010 | Kende et al. |
| 7,894,324 B2 | 2/2011 | Laroia et al. |
| 8,005,726 B1 | 8/2011 | Bao |
| 8,019,683 B1 | 9/2011 | Swanburg et al. |
| 8,064,392 B2 | 11/2011 | Chang et al. |
| 8,971,841 B2 | 3/2015 | Menezes et al. |
| 8,976,887 B2 | 3/2015 | Reingold |
| 9,124,436 B2 | 9/2015 | Kashanian |
| 9,137,698 B2 | 9/2015 | Li et al. |
| 9,154,225 B2 | 10/2015 | Smith |
| 9,191,974 B2 | 11/2015 | Chaudhuri et al. |
| 9,253,663 B2 | 2/2016 | Raleigh et al. |
| 9,264,372 B2 | 2/2016 | Stanwood et al. |
| 9,264,878 B2 | 2/2016 | Young et al. |
| 9,432,522 B2 | 8/2016 | Hutcheson et al. |
| 9,439,093 B2 | 9/2016 | Chetlur et al. |
| 9,456,354 B2 | 9/2016 | Branlund |
| 9,467,909 B2 * | 10/2016 | Faerber ............ H04W 36/0055 |
| 9,565,697 B2 | 2/2017 | Ameigeiras Gutierrez et al. |
| 9,603,047 B2 | 3/2017 | Sridhar et al. |
| 9,621,248 B2 | 4/2017 | Maltsev et al. |
| 9,647,918 B2 | 5/2017 | Raleigh et al. |
| 9,667,805 B2 | 5/2017 | Tapia |
| 9,775,050 B1 | 9/2017 | Wang et al. |
| 9,781,738 B2 | 10/2017 | Pietraski et al. |
| 9,794,825 B2 | 10/2017 | Grinshpun et al. |
| 9,813,973 B2 | 11/2017 | Ben Bassat et al. |
| 9,860,757 B2 | 1/2018 | Udeshi et al. |
| 9,883,049 B1 | 1/2018 | Warner |
| 9,924,045 B1 | 3/2018 | Guha et al. |
| 10,075,985 B2 | 9/2018 | Pawar et al. |
| 10,158,555 B2 | 12/2018 | Ghosh et al. |
| 10,405,331 B2 * | 9/2019 | Xiong .................. H04B 7/0417 |
| 10,419,943 B1 * | 9/2019 | Wong .................. H04W 72/085 |
| 10,462,777 B2 * | 10/2019 | Kim .................. H04W 52/0229 |
| 10,631,295 B2 * | 4/2020 | Bhushan ............ H04W 56/0015 |
| 10,694,395 B2 * | 6/2020 | Wong .................... H04W 16/32 |
| 10,743,202 B2 * | 8/2020 | Yerramalli ........... H04B 1/7087 |
| 2002/0142773 A1 | 10/2002 | Rudrapatna et al. |
| 2003/0012138 A1 | 1/2003 | Abdelilah et al. |
| 2004/0259567 A1 | 12/2004 | Valko et al. |
| 2004/0264371 A1 | 12/2004 | Chen |
| 2005/0094605 A1 | 5/2005 | Sun et al. |
| 2005/0254501 A1 | 11/2005 | Laiho |
| 2006/0098670 A1 | 5/2006 | Voit et al. |
| 2007/0178833 A1 | 8/2007 | Wahlberg et al. |
| 2007/0229214 A1 | 10/2007 | Meirick et al. |
| 2007/0275665 A1 | 11/2007 | Molnar et al. |
| 2008/0062890 A1 | 3/2008 | Temple |
| 2008/0147846 A1 | 6/2008 | Behroozi et al. |
| 2008/0233992 A1 | 9/2008 | Oteri et al. |
| 2008/0299986 A1 | 12/2008 | Lee |
| 2009/0240547 A1 | 9/2009 | Fellenstein et al. |
| 2010/0248643 A1 | 9/2010 | Aaron et al. |
| 2010/0273418 A1 | 10/2010 | Eruchimovitch et al. |
| 2011/0249678 A1 | 10/2011 | Bonicatto et al. |
| 2012/0027409 A1 | 2/2012 | Agrawal et al. |
| 2012/0113937 A1 | 5/2012 | Aramoto et al. |
| 2012/0176898 A1 | 7/2012 | Ehsan et al. |
| 2013/0007757 A1 | 1/2013 | Chambliss et al. |
| 2013/0067082 A1 | 3/2013 | Khan |
| 2013/0138956 A1 | 5/2013 | Swist |
| 2013/0138976 A1 | 5/2013 | Kim |
| 2013/0143553 A1 | 6/2013 | Beattie, Jr. et al. |
| 2013/0218814 A1 | 8/2013 | Kang et al. |
| 2013/0229953 A1 | 9/2013 | Nam et al. |
| 2013/0321225 A1 | 12/2013 | Pettus |
| 2014/0056149 A1 | 2/2014 | Mani et al. |
| 2014/0073337 A1 | 3/2014 | Hong et al. |
| 2014/0087739 A1 | 3/2014 | Weaver |
| 2014/0241174 A1 | 8/2014 | Harris et al. |
| 2014/0321282 A1 | 10/2014 | Pragada et al. |
| 2015/0043337 A1 | 2/2015 | Kanamarlapudi et al. |
| 2015/0071248 A1 | 3/2015 | Faerber et al. |
| 2015/0133131 A1 | 5/2015 | Van Phan et al. |
| 2015/0222345 A1 | 8/2015 | Chapman et al. |
| 2015/0230255 A1 | 8/2015 | Lopes |
| 2015/0296499 A1 | 10/2015 | Huang et al. |
| 2015/0325912 A1 | 11/2015 | Liu |
| 2015/0341872 A1 * | 11/2015 | Ryu .................... H04B 7/0404 370/350 |
| 2016/0020844 A1 | 1/2016 | Hart et al. |
| 2016/0066261 A1 | 3/2016 | Nasielski et al. |
| 2016/0086260 A1 | 3/2016 | Vermeulen et al. |
| 2016/0226703 A1 | 8/2016 | Grinshpun et al. |
| 2016/0269097 A1 | 9/2016 | Islam et al. |
| 2017/0181134 A1 * | 6/2017 | Niu ..................... H04B 17/318 |
| 2017/0230893 A1 | 8/2017 | Miao et al. |
| 2017/0245192 A1 | 8/2017 | Sadri et al. |
| 2017/0289837 A1 | 10/2017 | Duo et al. |
| 2017/0303160 A1 | 10/2017 | Poltorak et al. |
| 2017/0332282 A1 | 11/2017 | Dao |
| 2018/0020462 A1 | 1/2018 | Xiong et al. |
| 2018/0027561 A1 | 1/2018 | Segec et al. |
| 2018/0035301 A1 | 2/2018 | Nama et al. |
| 2018/0042018 A1 * | 2/2018 | Bhushan ................ H04W 16/14 |
| 2018/0091278 A1 | 3/2018 | Kanamarlapudi et al. |
| 2018/0092139 A1 | 3/2018 | Novlan et al. |
| 2018/0167919 A1 | 6/2018 | Kim et al. |
| 2018/0167941 A1 | 6/2018 | Zhang et al. |
| 2018/0192428 A1 | 7/2018 | Doostnejad et al. |
| 2018/0194248 A1 | 7/2018 | Quast |
| 2018/0198883 A1 | 7/2018 | Vuomos et al. |
| 2018/0220305 A1 | 8/2018 | Lei |
| 2018/0242184 A1 * | 8/2018 | Yerramalli ............ H04W 16/18 |
| 2018/0242291 A1 | 8/2018 | Moon et al. |
| 2018/0316481 A1 | 11/2018 | Montojo et al. |
| 2018/0351809 A1 | 12/2018 | Meredith et al. |
| 2018/0359746 A1 | 12/2018 | Kim et al. |
| 2018/0359801 A1 | 12/2018 | Kim et al. |
| 2018/0368114 A1 | 12/2018 | Chen et al. |
| 2018/0368126 A1 | 12/2018 | Islam et al. |
| 2019/0149365 A1 | 5/2019 | Chatterjee et al. |
| 2019/0150190 A1 | 5/2019 | Kim et al. |

(56) References Cited

U.S. PATENT DOCUMENTS

| | | | |
|---|---|---|---|
| 2019/0158332 A1 | 5/2019 | Akkarakaran et al. | |
| 2019/0274148 A1 | 9/2019 | Xiong et al. | |

FOREIGN PATENT DOCUMENTS

| | | | |
|---|---|---|---|
| WO | 2013/058673 A1 | 4/2013 | |
| WO | 2013/158237 A2 | 10/2013 | |
| WO | 2013/188629 A2 | 12/2013 | |
| WO | 2015/197537 A1 | 12/2015 | |
| WO | 2017/074362 A1 | 5/2017 | |

OTHER PUBLICATIONS

Ferdosian et al., "Greedy-Knapsack Algorithm for Optimal Downlink Resource Allocation in LTE Networks", Wireless Networks URL: https://arxiv.org/pdf/1601.03461.pdf, vol. 22, No. 5, Jul. 2016, pp. 1427-1440.

Anthony et al., "Data plan throttling: A Simple Consumer Choice Mechanism", 2013 IEEE Global Communications Conference (GLOBECOM), URL: https://suscholar.southwestern.edu/bitstream/handle/11214/125/DataPlanThrottling.pdf?sequence=1&isAllowed=y, Dec. 9-13, 2013, 6 pages.

Cisco, "Use Case: Speed Tiers Data Plan", At-A-Glance, URL:https://www.cisco.com/c/dam/en/us/solutions/collateral/service-provider/mobile-internet-applications-services/at-a-glance-c45-731340.pdf, Jul. 2014, 2 pages.

Dehos et al., "Millimeter-wave access and backhauling: the solution to the exponential data traffic increase in 5G mobile communications systems?", IEEE Communications Magazine, Sep. 2014, 8 pages.

Taori et al., "Point-to-multipoint in-band mmwave backhaul for 5G networks", IEEE Communications Magazine, Jan. 2015, 7 pages.

Mueck et al., "Spectrum sharing: Licensed shared access (lsa) and spectrum access system (sas)", Intel White Paper, Oct. 2015, 27 pages.

Gao et al., "MmWave massive-MIMO-based wireless backhaul for the 5G ultra-dense network", arXIV:1508.03940v3, Nov. 27, 2015, 7 pages.

Hur et al., "Millimeter wave beamforming for wireless backhaul and access in small cell networks", IEEE Transactions on Communications, vol. 61, No. 10, Oct. 2013, 13 pages.

Non Final Office Action received for U.S. Appl. No. 16/030,531 dated Dec. 10, 2018, 45 pages.

Non-Final Office Action received for U.S. Appl. No. 15/990,475 dated Jan. 9, 2019, 24 pages.

Non Final Office Action received for U.S. Appl. No. 16/010,332 dated Jan. 22, 2019, 41 pages.

Tony, "The Optimal Antenna Beam Width for the LTE Deployment: Base Station Antenna from the 1G to 4G—History, Field Study, Simulation, Paradigm Change, and now perhaps Paradigm Change again?", LTE University, Sep. 18, 2013, 3 pages.

Final Office Action received for U.S. Appl. No. 16/030,531 dated Jun. 28, 2019, 56 pages.

Notice of Allowance received for U.S. Appl. No. 15/990,475 dated May 15, 2019, 33 pages.

Notice of Allowance received for U.S. Appl. No. 16/010,332 dated May 7, 2019, 45 pages.

Non-Final Office Action received for U.S. Appl. No. 16/532,561 dated Oct. 31, 2019, 36 pages.

Non-Final Office Action received for U.S. Appl. No. 16/540,868 dated Oct. 29, 2019, 26 pages.

Non-Final Office Action received for U.S. Appl. No. 16/030,531 dated Nov. 18, 2019, 41 pages.

Final Office Action received for U.S. Appl. No. 16/030,531 dated Feb. 28, 2020, 44 pages.

\* cited by examiner

OVERLAY OF MILLIMETER WAVE (MMWAVE) ON CITIZENS BROADBAND RADIO SERVICE (CBRS) FOR NEXT GENERATION FIXED WIRELESS (NGFW) DEPLOYMENT

RELATED APPLICATIONS

The subject patent application is a continuation of, and claims priority to each of, U.S. patent application Ser. No. 16/532,561, filed Aug. 6, 2019 and entitled "OVERLAY OF MILLIMETER WAVE (MMWAVE) ON CITIZENS BROADBAND RADIO SERVICE (CBRS) FOR NEXT GENERATION FIXED WIRELESS (NGFW) DEPLOYMENT," which is a continuation of U.S. patent application Ser. No. 16/010,332 (now U.S. Pat. No. 10,419,943), filed Jun. 15, 2018 and entitled "OVERLAY OF MILLIMETER WAVE (MMWAVE) ON CITIZENS BROADBAND RADIO SERVICE (CBRS) FOR NEXT GENERATION FIXED WIRELESS (NGFW) DEPLOYMENT," the entireties of which applications are hereby incorporated by reference herein.

TECHNICAL FIELD

The subject disclosure relates to wireless communications, e.g., a system, method, and apparatus that overlays millimeter wave (mmWave) on citizens broadband radio service (CBRS) for next generation fixed wireless (NGFW) deployment.

BACKGROUND

With an explosive growth in network service demand, in both mobile and fixed networks, network providers are being challenged to find solutions that provide high capacity transport and data rates to the end users. Increasing the network capacity by deploying conventional access points does not scale well and can be extremely expensive, with substantially high capital expense (capex) and operating expense (opex) associated with utilizing fiber backhauls.

Further, the rapidly increasing demand for higher throughput and better user experience is driving the need to access more wireless spectrum. The citizens broadband radio service (CBRS) allows shared wireless broadband use of the 3550-3700 MHz band (3.5 GHz Band). Traditionally, this 3.5 GHz band has been used by the department of defense, fixed satellite systems, and some wireless ISPs. However, recently, the Federal Communications Commission (FCC) has provided a three-tiered spectrum access framework for sharing the CBRS spectrum. The shared access makes it difficult for a single network provider to acquire more than 80 MHz of spectrum, which poses challenges in providing a pragmatic peak downlink throughput of more than 500 Mbps per user.

DETAILED DESCRIPTION

Figure 1A:
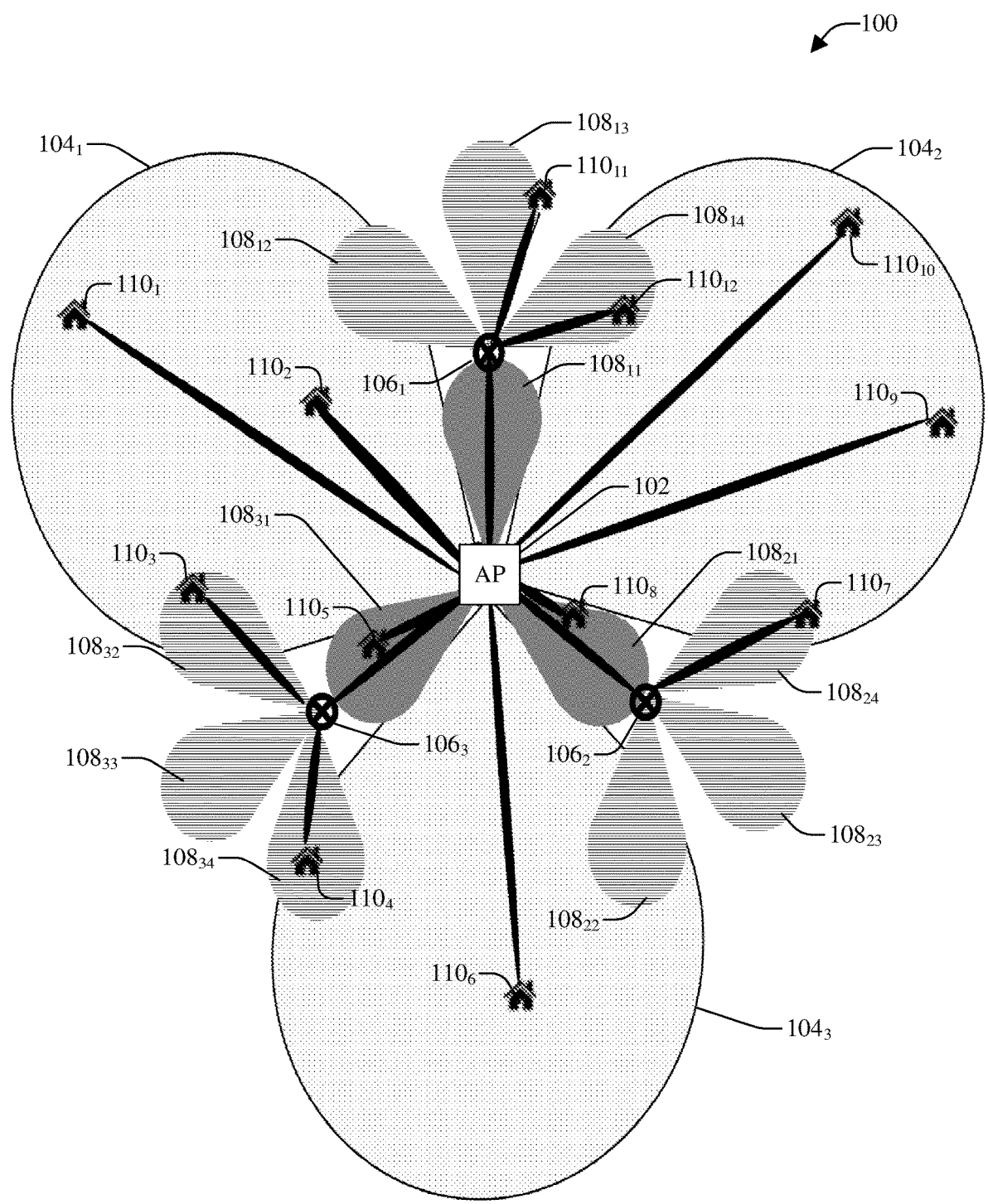
FIGS. 1A-1B illustrate example systems that facilitate a millimeter wave (mmWave) and citizens broadband radio service (CBRS) overlay scheme.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," "living unit," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

The systems and methods disclosed herein relate to adding an overlay of millimeter wave (mmWave)-capable cells to a citizens broadband radio service (CBRS) network to provide coverage in next generation fixed wireless (NGFW) network. The availability of mmWave licensed spectrum, with limited reach, can be utilized as a wireless backhaul for subsequent hops. In one aspect, integrated access front-haul nodes (IAFHNs) that are utilized for mmWave transmissions at a second (and/or subsequent) hop can be deployed with receivers of a self-aligning antenna and/or fixed antenna. Further, the IAFHNs can incorporate adaptive resource allocation scheduling in an integrated access and backhaul (IAB) chain. In addition, an Xn interface between macro access points can be enhanced to enable the adaptive resources allocation on the IAB chain. Furthermore, according to an embodiment, user equipment (UE) can be configured with dual connectivity (DC) and the network operator can offer different tiers of services (e.g., regular speed (CBRS only), high speed (mmWave only should locations are warranted), and very high speed of 1 Gbps (DC between CBRS and mmWave)) based on a location of the UE.

It should be noted that although various aspects and embodiments have been described herein in the context of fifth generation (5G) networks, the disclosed aspects are not limited to a 5G implementation as the techniques can also be applied most any next generation and/or long term evolution (LTE) networks. As used herein, "5G" can also be referred to as New Radio (NR) access. Accordingly, systems, methods, and/or machine-readable storage media for facilitating improved communication coverage for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Radio spectrum, used for mobile communication, is a scarce resource. In an effort to develop better utilization and ensure that there is enough available spectrum to support the explosive growth of wireless data, the Federal Communications Commission (FCC) has authorized the use of the 3.5 GHz band (3550 MHz to 3700 MHz) for shared wireless access, allowing access to previously protected spectrum used by the U.S. Navy and other department of defense (DoD) members. Moreover, a three-tiered spectrum access framework, enforced by a spectrum access system (SAS), is utilized to share this spectrum. Although, CBRS has favorable propagation properties and can have larger coverage/range, the FCC has limited the equivalent isotropically radiated power (EIRP) (e.g., product of transmitter power and the antenna gain in a given direction relative to an isotropic antenna of a radio transmitter) for CBRS transmission to 47 dBm/10 MHz for Cat-B device (and/or 50 dBm/20 MHz, and/or 57 dBm/100 MHz). As an example, this provides a useful range of around 2 km with a typical antenna deployment (e.g., 65 degrees horizontal beam width). Further, the limited spectrum of 150 MHz is shared among the three tiers based on priority. Thus, it is very difficult for a single network operator to be allocated sufficient spectrum (e.g., 80 MHz or more). With this narrow swath of spectrum is difficult for the network operator provide a pragmatic peak downlink (DL) throughput of greater than 500 Mbps per user.

According to an embodiment, to improve coverage and/or increase the per user DL throughput, mmWave coverage can be overlaid with the CBRS coverage. However, mmWave has extremely challenging propagation properties because of the high frequencies (e.g., 28 GHz and higher). Moreover, mmWave communications suffer from a substantial propagation loss as compared to other communication systems that use lower carrier frequencies. However, the EIRP limit set for mmWave transmissions is higher than that of CBRS. For example, for a bandwidth of 100 MHz, CBRS only allows a transmission of 57 dBm, while mmWave can allow a transmission of 75 dBm. Presently, for a typical 65 degree horizontal beam width antenna, the EIRP of a mmWave base station is 55 dBm. Accordingly, in one aspect, the transmission power and/or antenna gain of the mmWave base station can be increased in one or more configurations to increase the EIRP up to 75 dBm. Moreover, the higher EIRP can provide a longer transmission range. As an example, an EIRP of 75 dBm with a 65-degree horizontal beam width can be utilized to provide a significantly longer than 300-meter range for mmWave transmissions. Since the mmWave spectrum is not shared among entities, a wide swath of spectrum can be allocated to network operators, which can then utilize the additional spectrum to higher pragmatic peak DL throughput (e.g., greater than 1 Gbps).

Figure 1B:
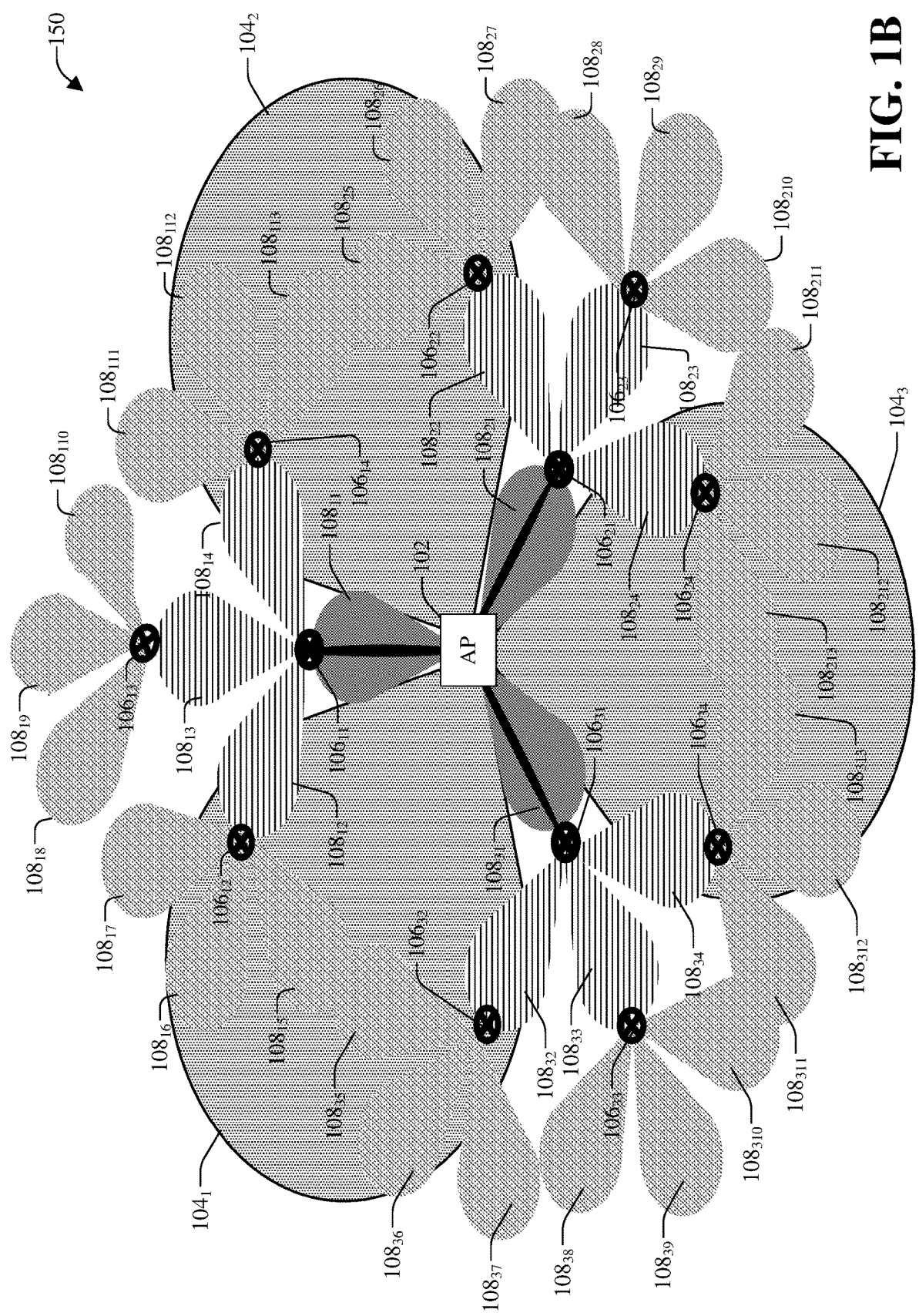

Referring initially to FIGS. 1A-1B, there illustrated are example systems 100 and 150 that facilitate a mmWave and CBRS overlay scheme, according to one or more aspects of the disclosed subject matter. As illustrated, FIG. 1A depicts a two-tier mmWave overlay system while FIG. 1B depicts a three-tier mmWave overlay system. Due to the large separation of frequencies, interference between the CBRS and mmWave transmissions is insignificant. The CBRS and/or mmWave cells can be deployed at (or be coupled to) an existing cell tower, for example, a macro access point (AP), for example, AP 102, that already has a wired backhaul link connected to the core mobility network, smart integrated access device (SIAD), and/or other cell-site infrastructure. Moreover, the CBRS and mmWave cells can utilize the backhaul link, SIAD, and/or other cell-site infrastructure of the macro access point to reduce capex and/or opex costs.

According to an aspect, the AP 102 can further comprise a CBRS radio and mmWave radio. The CBRS radio can provide one or more coverage areas $104_1$-$104_3$. As an example, the CBRS radio can utilize a 65° antenna beamwidth at the maximum EIRP limit to provide the blanket coverage. The CBRS, having a longer range, can be overlaid with a mmWave that has a much shorter range (e.g., 500 meters). The range of the mmWave radio can be extended by deploying one or more integrated access front-haul nodes (IAFHNs) ($106_1$, $106_2$, and $106_3$) that relay data from the AP 102 to the served user equipment (and vice versa). In one aspect, a first hop of mmWave transmission can provide one or more coverage areas $108_{11}$, $108_{21}$, and $108_{31}$. Further, the first hop of mmWave transmissions can provide wireless backhaul links to one or more IAFHNs ($106_1$, $106_2$, and $106_3$), which can radiate mmWave transmissions to provide coverage areas $108_{12}$, $108_{13}$, $108_{14}$, $108_{22}$, $108_{23}$, $108_{24}$, $108_{32}$, $108_{33}$, and $108_{34}$, respectively. Additionally, or optionally, as shown in system 150, a third hop mmWave radio can be added (e.g., if availability of spectrum is warranted). For example, second tier IAFHNs ($106_{11}$, $106_{21}$, and $106_{31}$) can provide wireless backhaul links to one or more third tier IAFHNs ($106_{12}$, $106_{13}$, $106_{14}$, $106_{22}$, $106_{23}$, $106_{24}$, $106_{32}$, $106_{33}$, $106_{34}$), which can radiate mmWave transmissions to provide coverage areas $108_{15}$, $108_{16}$, $108_{17}$, $108_{18}$, $108_{19}$, $108_{110}$, $108_{111}$, $108_{112}$, $108_{113}$, $108_{25}$, $108_{26}$, $108_{27}$, $108_{28}$, $108_{29}$, $108_{210}$, $108_{211}$, $108_{212}$, $108_{213}$, $108_{35}$, $108_{36}$, $108_{37}$, $108_{38}$, $108_{39}$, $108_{310}$, $108_{311}$, $108_{312}$, and $108_{313}$).

According to an aspect, the range of the mmWave antennas (e.g., within IAFHNs $106_1$, $106_2$, $106_3$, $106_{11}$, $106_{21}$, $106_{31}$, $106_{12}$, $106_{13}$, $106_{14}$, $106_{22}$, $106_{23}$, $106_{24}$, $106_{32}$, $106_{33}$, and/or $106_{34}$) can be extended (e.g., from 200-300 meters to 400-500 meters or longer) by utilizing a narrow beam antenna (e.g., 30° to 45° antenna beam-width). Typically, antenna beams can be focused to specified areas, for example, with high UE density, poor CBRS coverage, etc.

Further, frequency division of the wide spectrum of mmWave frequency can be performed. A portion (e.g., 100 MHz) of total available mmWave frequency band can be reserved for the backhaul to the second-tier radio and its operating frequency. As an example, different portions of the total available mmWave frequency band can be utilized by each mmWave hop. Additionally, or optionally, a sub-carrier frequency can be changed from 15 kHz (symbol time=66.67 µs, transmission time interval (tti)=1 ms) to $2^N \times 15$ kHz. For example, if the subcarrier frequency is set at 120 kHz (symbol time=8.3 µs, tti=5 µs), latency can be significantly improved and scheduling can be more flexible.

Based on its location, UEs (e.g., UEs $110_1$-$110_{11}$) can be served by the CBRS radio, the mmWave radio, or a combination of the CBRS radio and the mmWave radio. For example, UE $110_1$ can be served by the CBRS cell (deployed within AP 102), UE$110_{11}$ can be served by the mmWave IAFHN $106_1$, and UE $110_3$ can have dual connectivity with both the CBRS cell and the mmWave IAFHN $106_3$. CBRS employs a three-tier approach to prioritize the use of the spectrum. On the first tier are incumbents, such as, radars, fixed satellite stations, and wireless Internet service providers (WISP). On the second tier are entities that purchase exclusive use licenses, called priority access licenses (PAL), while on the third tier are users that have non-exclusive use rights called general authorized access (GAA). As an example, the entities on the second tier have a higher priority than those on the third tier. According to an aspect, the CBRS PAL can be utilized as an anchor and overlaid with mmWave to provide DC to the UEs. As an example, control plane data (and additionally or optionally some user plane data) can be transmitted over the CBRS frequencies (e.g., via the CBRS radio), while user plane data can be transmitted over the mmWave frequencies (e.g., via mmWave radio), resulting in a substantially higher data throughput (e.g., greater than or equal to 1 Gbps).

Typically, the UEs can comprise most any terminal of a next generation fixed wireless (NGFW) network, such as but not limited to an automation device and/or consumer electronic device, for example, a tablet computer, a digital media player, a wearable device, a digital camera, a media player, a personal computer, a personal digital assistant (PDA), a laptop, a gaming system, set top boxes, home automation and/or security systems, an Internet of things (IoT) device, industrial automation system, etc. Moreover, the UEs can be stationary and/or have limited mobility. Moreover, fixed UEs can provide gain and directivity for the link budget. For example, the UE antenna can be pointed towards access points and can have a higher gain antenna to establish a reliable radio link. For fixed UEs, a spotty coverage is sometimes acceptable. For example, if areas that do not have good coverage are known, the network operator does not offer service to subscribers in that area.

By providing mmWave overlay coverage, the CBRS radio can conserve resources for one or more UEs (e.g., UEs $110_3$, $110_4$, $110_5$, $110_8$, etc.) that are located near (e.g., within a defined distance from) the cell (e.g., AP 102). Moreover, the CBRS radio can provide coverage to one or more UEs (e.g., UEs $110_1$, $110_6$, $110_9$, $110_{10}$, etc.) that are located within an area that does not fall within the mmWave coverage, for example, at the cell edges (e.g., over 1 Km from the AP 102). It is noted that the in FIGS. 1A-1B provide a simplistic representation of coverage areas and the subject disclosure is not limited to the shapes, sizes, and/or overlap of the coverage areas depicted within FIGS. 1A-1B.

Figure 2:
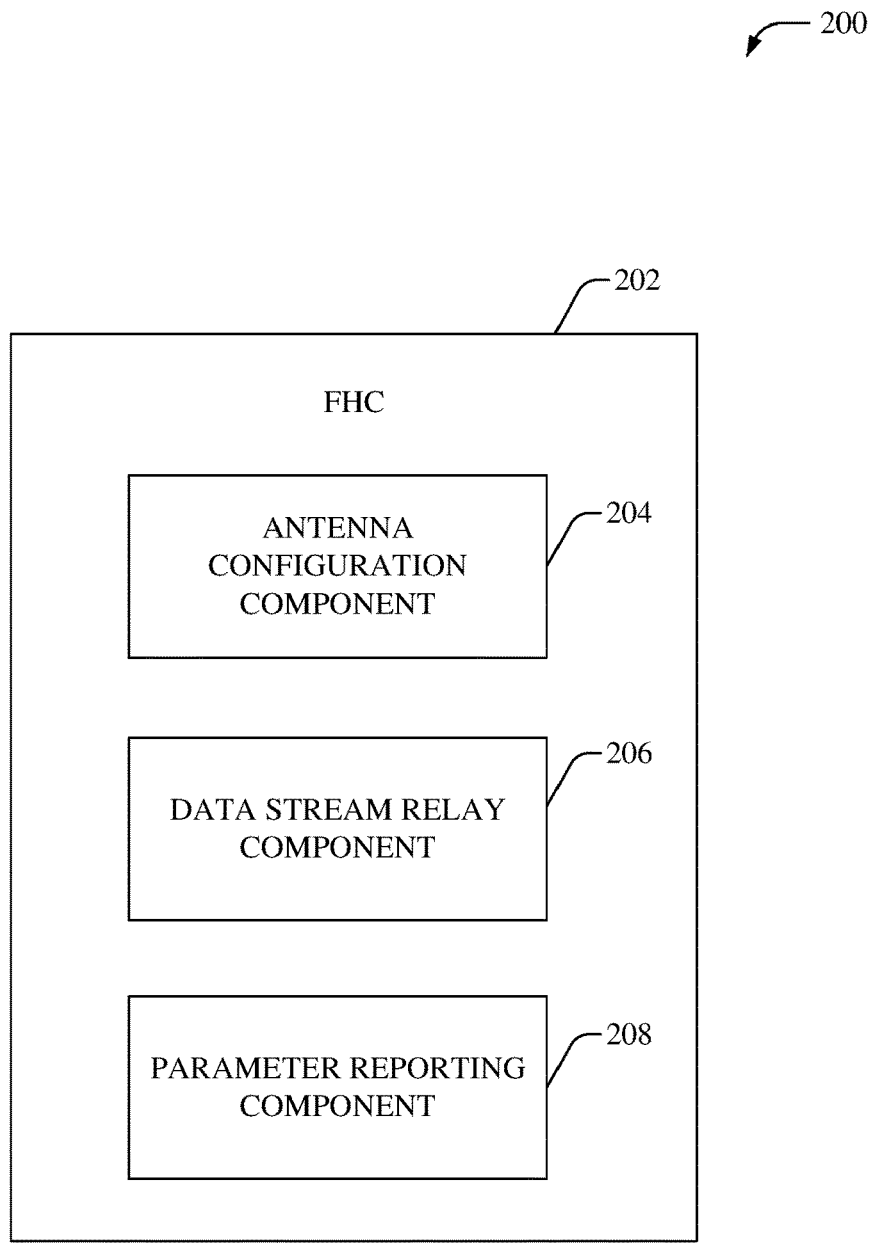
FIG. 2 illustrates an example system that employs an application-specific transceiver for relaying mmWave communication.

Referring now to FIG. 2, there illustrated is an example system 200 that employs an application-specific transceiver cell for relaying mmWave communication, in accordance with an aspect of the subject disclosure. It is noted that the IAFHN 202 can be substantially similar to IAFHNs $106_1$, $106_2$, $106_3$, $106_{11}$, $106_{21}$, $106_{31}$, $106_{12}$, $106_{13}$, $106_{14}$, $106_{22}$, $106_{23}$, $106_{24}$, $106_{32}$, $106_{33}$, and $106_{34}$ and comprise functionality as more fully described herein, for example, as described above with regard to IAFHNs $106_1$, $106_2$, $106_3$, $106_{11}$, $106_{21}$, $106_{31}$, $106_{12}$, $106_{13}$, $106_{14}$, $106_{22}$, $106_{23}$, $106_{24}$, $106_{32}$, $106_{33}$, and $106_{34}$. The various aspects discussed herein can facilitate improved coverage in a wireless communications system. Although system 200 has been described with respect to a 5G network, it is noted that the subject disclosure is not limited to 5G networks and can be utilized in most any communication network.

In one example, the IAFHN 202 can be deployed as a standalone unit or can be mounted on (and/or embedded within) a structure (e.g., a lamp post, a traffic light, façade of a building, on a road sign, a billboard sign, etc.). The IAFHN 202 can comprise a wireless communication transceiver module that comprise one or more self-aligning antenna arrays and/or fixed antenna arrays. Typically, the IAFHN 202 is fixed and stationary, however, the subject specification is not limited to a fixed and/or stationary IAFHN. In one aspect, the IAFHN 202 can utilize an antenna configuration component 204 to control one or more configuration parameters of an antenna of the IAFHN 202 to direct antenna beams to specific areas. As an example, the configuration parameters can comprise, but are not limited to, beam direction, antenna phase, transmit power, gain of amplifiers, polarization mode, etc. Moreover, the IAFHN 202 can comprise an integrated enclosure with one or more tunable antennas for ease of antenna alignment to the upper tier IAFHN/AP and/or to its coverage areas. Although not shown explicitly in FIG. 2, it is noted that the IAFHN 202 can comprise hardware to broadcast mmWave signals, similar to a base station.

According to an embodiment, the IAFHN 202 can comprise a data stream relay component 206 that can relay data between the mmWave radios hops. For example, the data stream relay component 206 can convert the data stream from the first hop mmWave radios as the back haul for the second hop mmWave radios. In other words, the IAFHN 202 can connect to the first hub (e.g., mmWave radio deployed at the AP 102) and utilize the wireless mmWave connection as a backhaul link. Further, the IAFHN 202 can re-radiate over different frequencies (e.g., configured by the antenna configuration component 204) to serve user in the second hop. For example, the frequency band utilized for mmWave transmission in the first hop (e.g., from the AP 102 to the IAFHN $106_1$) can be different from the frequency band utilized for mmWave transmission in the second hop (e.g., radiated from the IAFHN $106_1$).

According to an aspect, the antenna configuration component 204 can configure a first antenna that is used for a wireless backhaul link with narrower beam-width (e.g., 10°-15° horizontally) and higher gain (e.g., 21 dBi) to provide a reliable and/or stable link with increased signal quality. Further, the antenna configuration component 204 can configure a second antenna that is used for serving the UEs, with a narrow beam-width, and with higher gain (e.g., utilize 21 dBi versus the typical 17 dBi gain). In one aspect, the shared data channel (SDCH) on the mmWave can be on the beam-forming scheme (e.g., configured via the antenna configuration component 204). If availability of spectrum is warranted, a third hop mmWave radio can be added (as depicted in FIG. 1B). In this example scenario, the 13 total mmWave radios can provide around 60% of the cell coverage of the CBRS radio. Typically, the antenna(s) utilized for the wireless backhaul link can have a narrower beam width antenna with higher gain than that of the antenna(s) utilized for serving the UE, for example, to achieve a more reliable connectivity with the serving access point.

According to an embodiment, the IAFHN 202 is a new class of UE that has different attributes, protocols, and/or signaling than the conventional UEs. The signaling to IAFHN 202 is streamlined from some of the traditional signaling. For example, authentication and security on the IAFHN 202 can be streamlined since each individual UE, served by the IAFHN 202, can perform its own security measure. Since the IAFHN 202 does not perform network authentication, it does not comprise a subscriber identity module (SIM) card and/or authentication layer. Further, in contrast with a traditional UE, the IAFHN 202 does not utilize tracking area update, paging, and discontinuous reception (DRX) mode mechanisms. Furthermore, the IAFHN 202 does not comprise a radio resource control (RRC) inactivity timer.

In one aspect, the IAFHN 202 can utilize the parameter reporting component 208 to report, among other attributes, its class (e.g., a maximum data rate of UE), band class (e.g., a frequency band that is utilized), category, hop (e.g., first hop, second hop, third hop, etc.), and sector configuration (e.g., a number of sectors), etc. As an example, the parameter reporting component 208 can provide the report to an upper tier IAFHN and/or AP (e.g., AP 102), periodically, during a registration phase, at a specified time, in response to an event, on-demand, etc. The upper tier IAFHN and/or AP can analyze the data received from served IAFHNs and determine optimal spectrum distribution for the IAFHNs.

Figure 3:
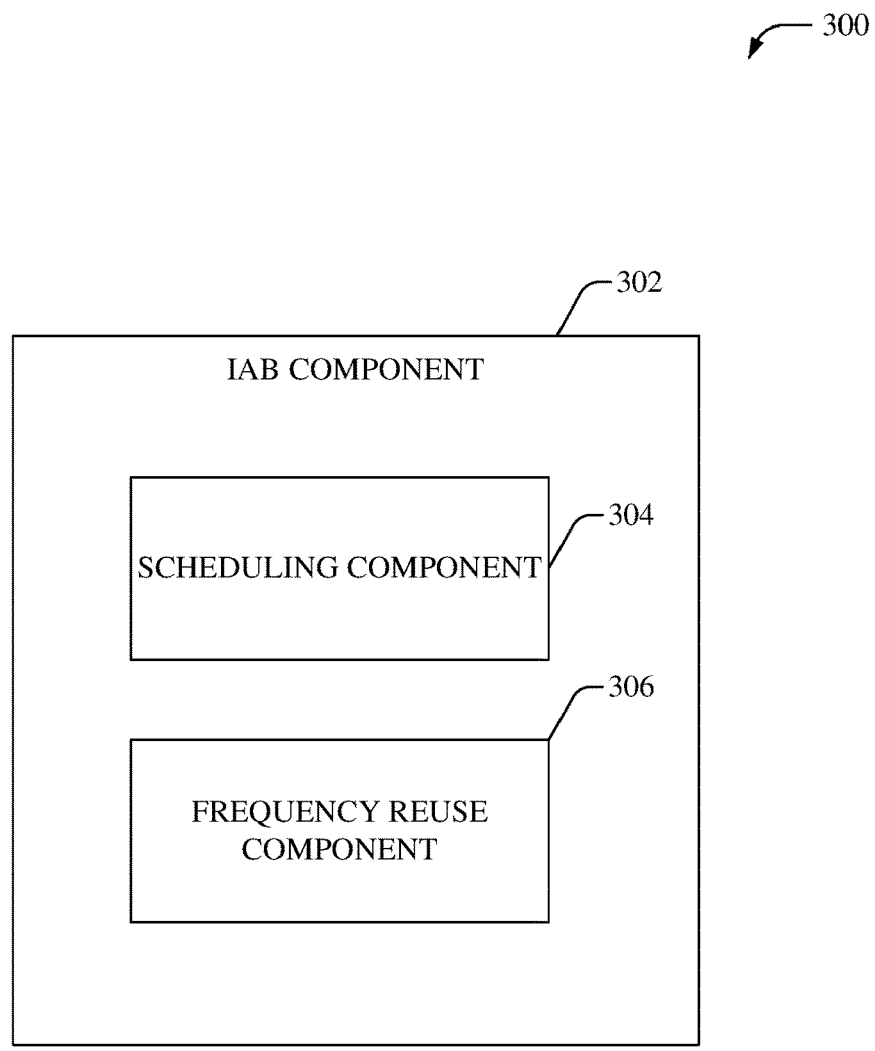
FIG. 3 illustrates an example system that facilitates an adaptive resource allocation scheduling in an integrated access and backhaul (IAB) chain.

Referring now to FIG. 3, there illustrated is an example system 300 that facilitates adaptive resource allocation scheduling in an integrated access and backhaul (IAB) chain, in accordance with an aspect of the subject disclosure. In one example, an IAB component 302 can be utilized to perform resource block scheduling (e.g., via the scheduling component 304) and/or determine an optimal frequency reuse configuration (e.g., via the frequency reuse component 306) for mmWave cells that overlay CBRS. It is noted that the IAFHNs and/or APs (e.g., AP 102) described herein can comprise at least portion of the IAB component 302.

In an aspect, assuming that UEs are evenly distributed, a resource block (RB) demand will increase with each hop. For example, the RB demand for a second hop IAFHN, having three times the overall coverage areas, can be three times higher than the RB demand for a first hop AP. Similarly, the RB demand for a third hop IAFHN can be three times higher than the RB demand for the second hop IAFHN. The scheduling component 304 can intelligently allocate RBs according to various parameters, such as but not limited to a traffic demand, quality of service (QoS) targets, radio frequency (RF) condition on each of the IAFHN, etc., to meet a defined service level agreement (SLA).

Further, in another aspect, the frequency reuse component 306 can be utilized to determine and implement an optimal frequency reuse configuration. As an example, the frequency reuse component 306 can increase the frequency reuse distance on the IAFHN to mitigate the conceivable co-channel interference. As an example, the RB (e.g., on the frequency and/or time domain) on the first hop within a specific coverage area can be better served as far away as possible (e.g., maximum possible reuse distance) on another adjacent mmWave radio. Moreover, a different frequency (and/or different subcarrier) can be utilized in every frame and/or subframe. For example, the frequency reuse component 306 can control the frequency (and/or subcarrier) utilized in every frame and/or sub frame transmitted within each of the coverage areas to ensure that the frequency reuse is as far as possible.

Figure 4:
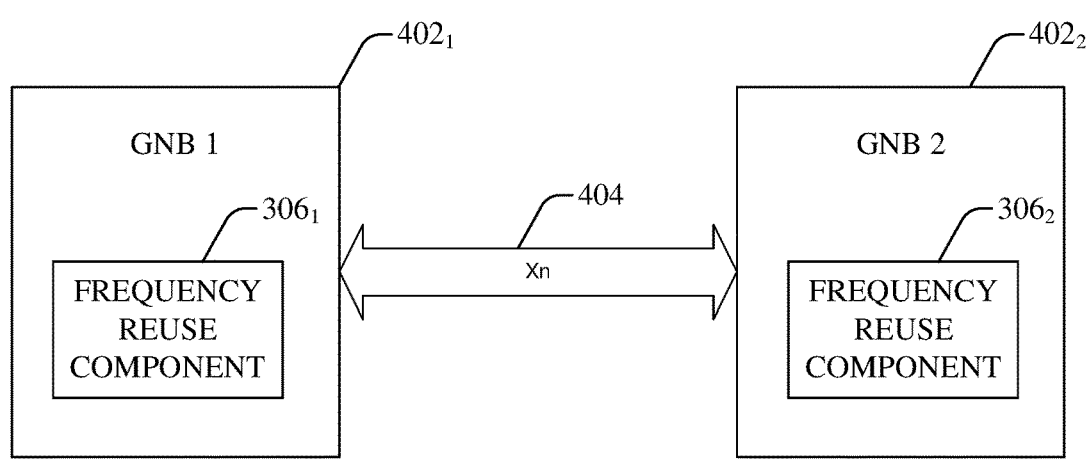
FIG. 4 illustrates an example system that facilitates improved frequency reuse planning.

FIG. 4 illustrates is an example system 400 that facilitates frequency reuse planning, according to an aspect of the subject disclosure. It is noted that frequency reuse component $306_1$-$306_2$ can be substantially similar to frequency reuse component 306 and can comprise functionality as more fully described herein, for example, as described above with regard to frequency reuse component 306. Although system 400 has been described with respect to a 5G network, it is noted that the subject disclosure is not limited to 5G networks and can be utilized in most any other communication network.

The gNBs 402$_1$-402$_2$ can be neighboring gNBs that provide CBRS coverage, overlaid with mmWave coverage. According to an aspect, the frequency reuse component 306$_1$-306$_2$ can exchange frequency utilization data via an Xn interface 404. For example, the frequency reuse component 306$_1$ can provide information indicative of the frequency bands utilized for mmWave transmission at each hop. In this example, the frequency reuse component 306$_2$ can analyze the information to allocate appropriate frequency bands for mmWave transmission at each of its hops, such that the frequency reuse distance is increased and thus, conceivable co-channel interference can be decreased.

Figure 5:
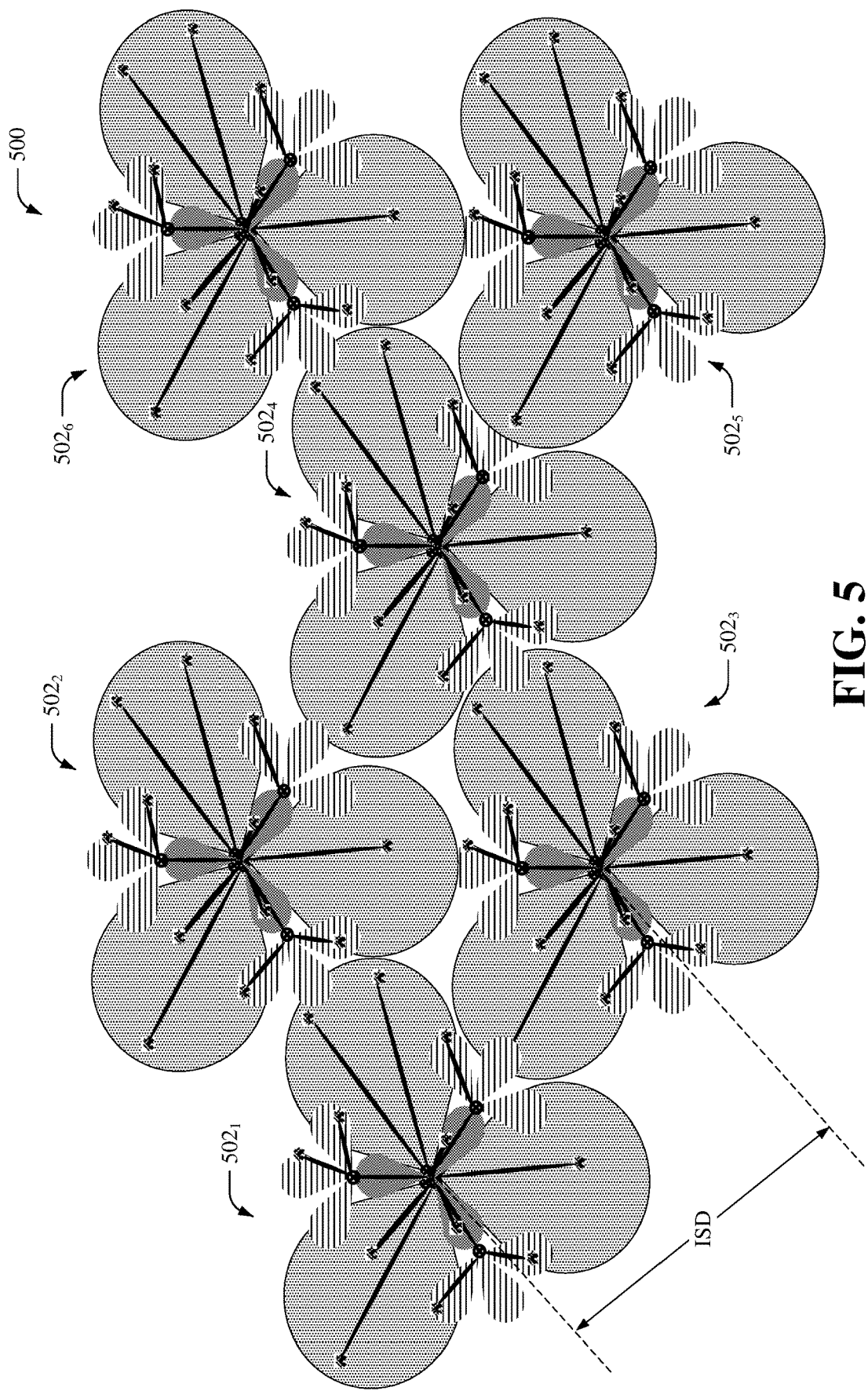
FIG. 5 illustrates an example cluster of cells that provide CBRS coverage, overlaid with mmWave coverage.

FIG. 5 illustrates an example system 500 that depicts a cluster of cells that provide CBRS coverage, overlaid with mmWave coverage, according to an aspect of the subject disclosure. It is noted that cells 502$_1$-502$_6$ can be substantially similar to cell 100 and can comprise functionality as more fully described herein, for example, as described above with regard to cell 100. In an aspect, the cells 502$_1$-502$_6$ can comprise APs that facilitate frequency reuse planning (e.g., via frequency reuse component 306). As an example, a frequency band utilized by a mmWave radio within a first hop of cell 502$_1$ can be reused by a mmWave radio within a second hop of cell 502$_2$.

It is noted that the inter-site distance (ISD) of the current macro AP deployment is 3 km and thus, even though the CBRS radio can transmit up to 3 km, typically, a coverage radius of 1.5 km is provided. For a two-hop mmWave overlay, the total coverage area of four mmWave radios can be 16% of the CBRS coverage area. For a three-hop mmWave overlay, the total coverage area of thirteen mmWave radios can be 60% of the CBRS coverage area.

Figure 6:
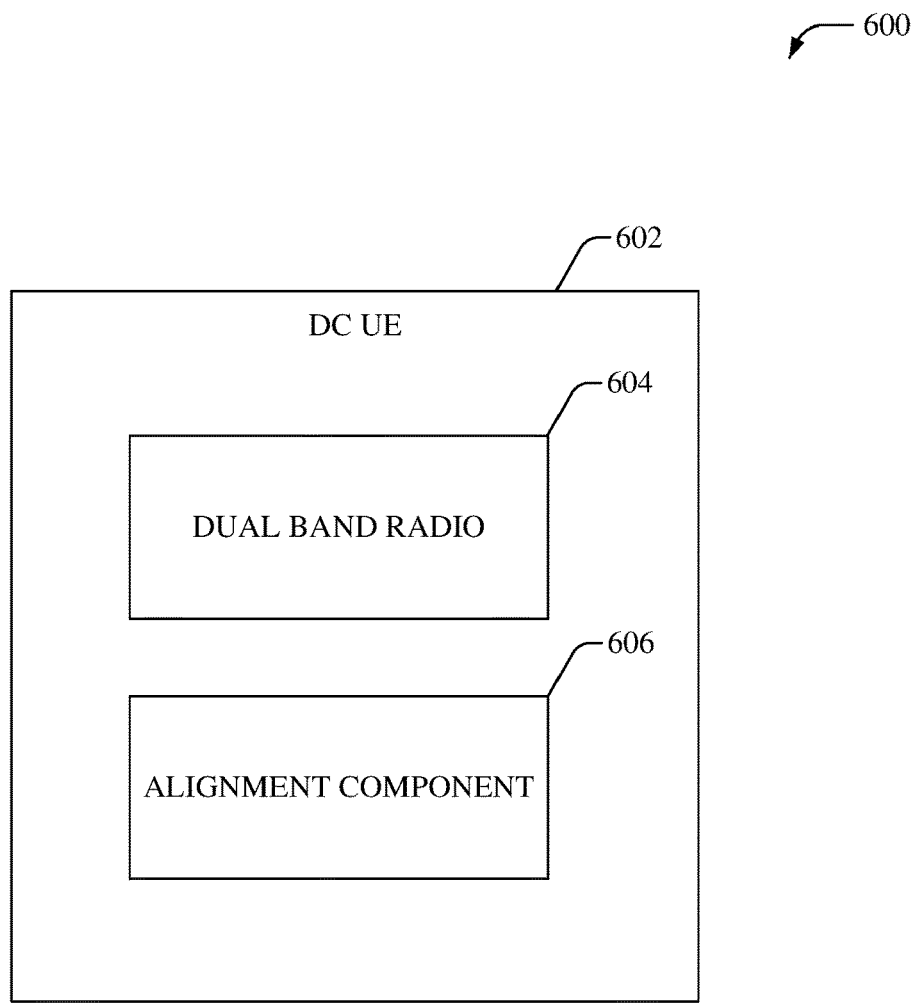
FIG. 6 illustrates an example system that facilitates dual connectivity (DC) in accordance with the subject embodiments.

Referring now to FIG. 6, there illustrated is an example system 600 that facilitates dual connectivity (DC) in accordance with the subject embodiments. A DC UE 602 can comprise a dual band radio that can be implemented by combining LTE and NR RF front ends to the same NR baseband chip. It is noted that the DC UE 602 can be substantially similar to UEs 110$_1$-110$_{11}$ and can comprise functionality as more fully described herein, for example, as described above with regard to UEs 110$_1$-110$_{11}$. Typically, the DC UE 602 can be located within an area with good mmWave coverage and at least reasonable CBRS coverage. By facilitating simultaneous (and/or substantially simultaneous) communication with both a CBRS cell and a mmWave cell, a DL throughput of greater than 1 GB/sec can be received.

CBRS employs a three-tier approach to prioritize the use of the spectrum. According to an aspect, the CBRS PAL can be utilized as an anchor and overlaid with mmWave to provide DC to the DC UE 602. As an example, control plane data (and additionally or optionally some user plane data) can be received over the CBRS frequencies (e.g., via the dual band radio 604) while, user plane data can be received over the mmWave frequencies (e.g., via the dual band radio 604), resulting in a substantially higher data throughput.

In one embodiment, an alignment component 606 can be utilized to control a direction of one or more antennas of the dual band radio 604. Typically, the CBRS signal can be received from a cell located in a first direction, while the mmWave signal can be received from a cell located in a second (different) direction. In an aspect, the dual band radio 604 can comprise a cylindrical-shaped self-aligning antenna that can have multiple panel antennas that selectively point to a direction of a stronger signals in two different bands. For example, the multiple panel antennas can point towards the mmWave cell in one direction and towards a CBRS cell in another direction.

As traffic demands increase, cell splitting and/or densification can be implemented and the location of serving cells can change. Accordingly, in one aspect, the alignment component 606 can receive, from a network device, information to reconfigure the antennas. The information can comprise instructions to connect to new and/or different cells (e.g., CBRS and/or mmWave cells) for load balancing and/or improved network performance. In another aspect, the alignment component 606 can determine antenna configurations based on artificial intelligence (AI) and/or machine learning techniques and can intelligently point the antennas in a direction that can receive the strongest signals.

Figure 7:
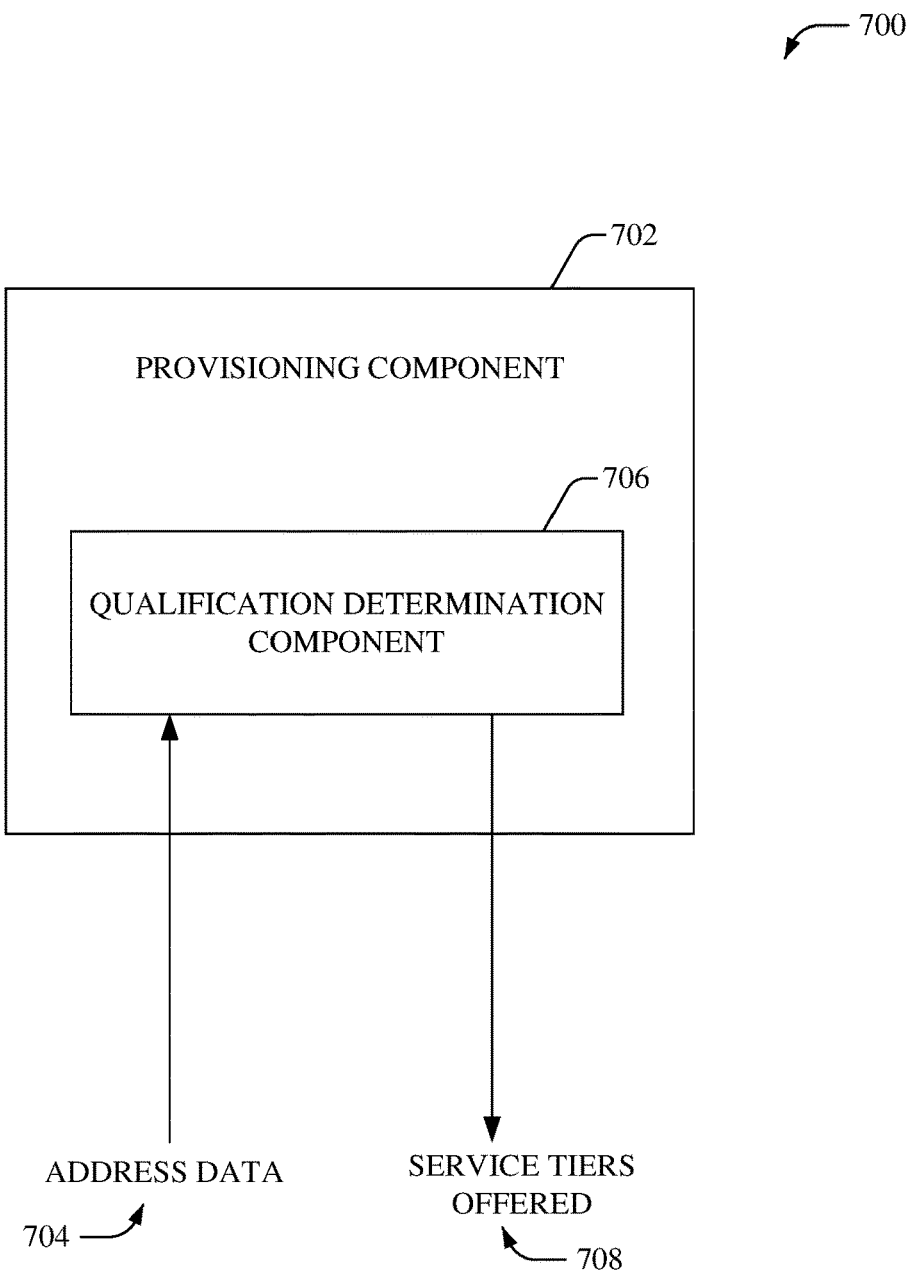
FIG. 7 illustrates an example system that facilitates offering different tiers of service to a user.

FIG. 7 illustrates an example system 700 that facilitates offering different tiers of service to a user. In one aspect, a provisioning component 702 can implemented within one or more network devices of the mobility network and can be utilized to determine a tier of service that can be offered to a user. As an example, different fees can be charged for the different tiers of service.

A request to set up a new (and/or update an existing) service agreement can be received by the provisioning component 702, for example, from a point of sale (POS) device, a UE management portal, and/or a customer care platform, etc. In one aspect, for fixed and/or nomadic UEs, address data 704 indicative of a location and/or area of the UE (and/or a location/area where the UE is intended to be deployed), for example, postal address, GPS location, etc., can be provided to the provisioning component 702. As an example, a UE management portal can comprise a networked interface, e.g., a self-service or self-care web portal, which can be accessed by a new customer or existing subscriber and can further support aspects of UE registration, activation, and management thereof. In another example, the customer care platform can be accessed and operated by customer care agents to facilitate activation/deactivation of service, configuration of fees/rate plans, validation and changes of address, creation of subscriber accounts, etc.

According to an embodiment, a qualification determination component 706 can assess a radio environment at the UE's location to determine service tiers that can be offered at that location. For example, if determined that only CBRS coverage is available at the location, a first speed tier can be offered; if determined that only mmWave coverage is available at the location, a second speed tier can be offered; and if determined that both CBRS and mmWave coverage is available at the location, a third speed tier can be offered (e.g., wherein the first speed is lower than the second speed, which is lower than the third speed). The determined service tiers that can be offered at the location 708 can be presented to the user. Based on the offered service tier, UEs with a single-mode or dual-mode receiver can be deployed at the location.

FIGS. 8-11 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 8:
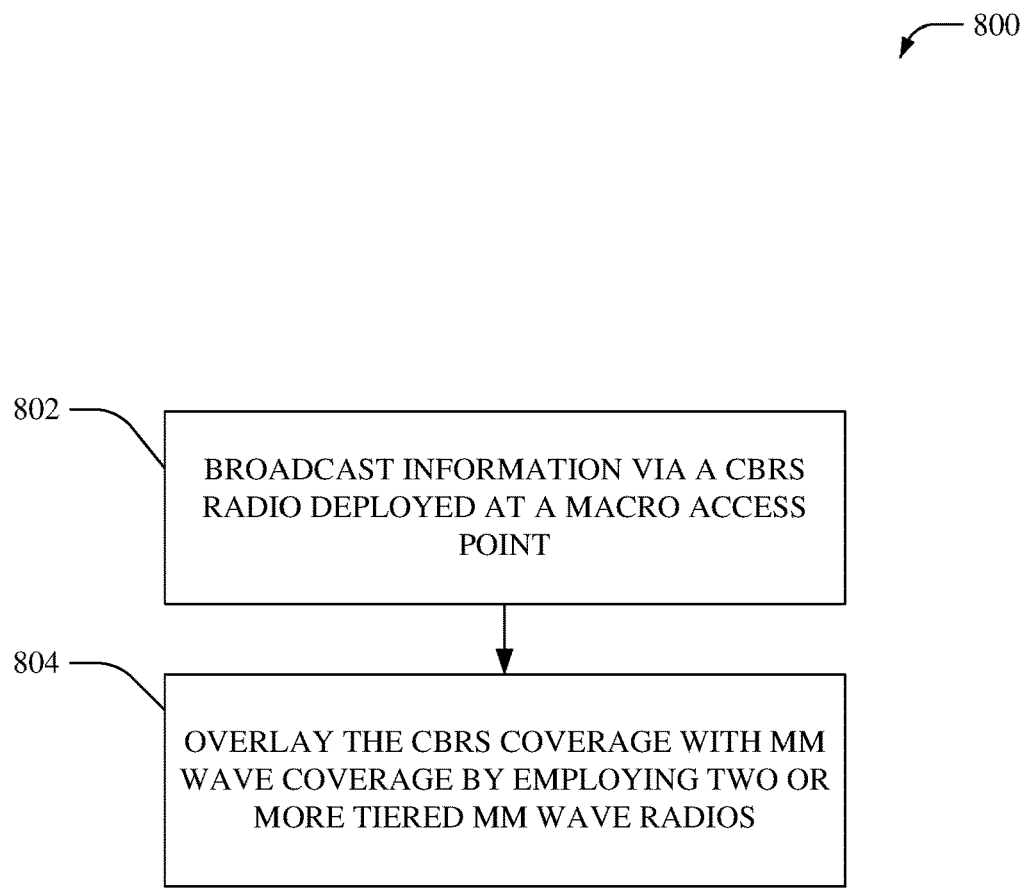
FIG. 8 illustrates an example method that facilitates overlaying a CBRS coverage with mmWave coverage.

Referring now to FIG. 8 there illustrated is an example method 800 that facilitates overlaying a CBRS coverage with mmWave coverage, according to an aspect of the subject disclosure. In an aspect, method 800 can be implemented by one or more network devices (e.g., AP 102) of a communication network (e.g., cellular network). At 802, information can be broadcast via a CBRS radio deployed at a macro access point. It is noted that the subject specification is not limited to the CBRS radio (and/or first hop mmWave radio) being deployed within the macro access point and that the CBRS radio (and/or first hop mmWave radio) can be coupled to the macro access point to share storage, processing, and/or backhaul resources of the macro access point. At 804, the CBRS coverage can be overlaid with a mmWave coverage by employing two or more tiered-mmWave radios, for example, that utilize IAB. Since the existing backhaul resources of the macro access point are utilized by CBRS radio and/or the first hop mmWave radio, and subsequent hop mmWave radio(s) utilize wireless backhaul links, capex and opex costs can be significantly reduced. Further, since there is a wide separation between the CBRS and the mmWave frequency bands, minimal performance degradation is observed between the bands. In one aspect, resources for UEs that are closer to the CBRS radio can be conserved since these UEs can be served by the shorter-range mmWave radio(s), while CBRS coverage can be provided to UEs that are further away from the CBRS radio (e.g., outside the range of the mmWave radio(s)).

Figure 9:
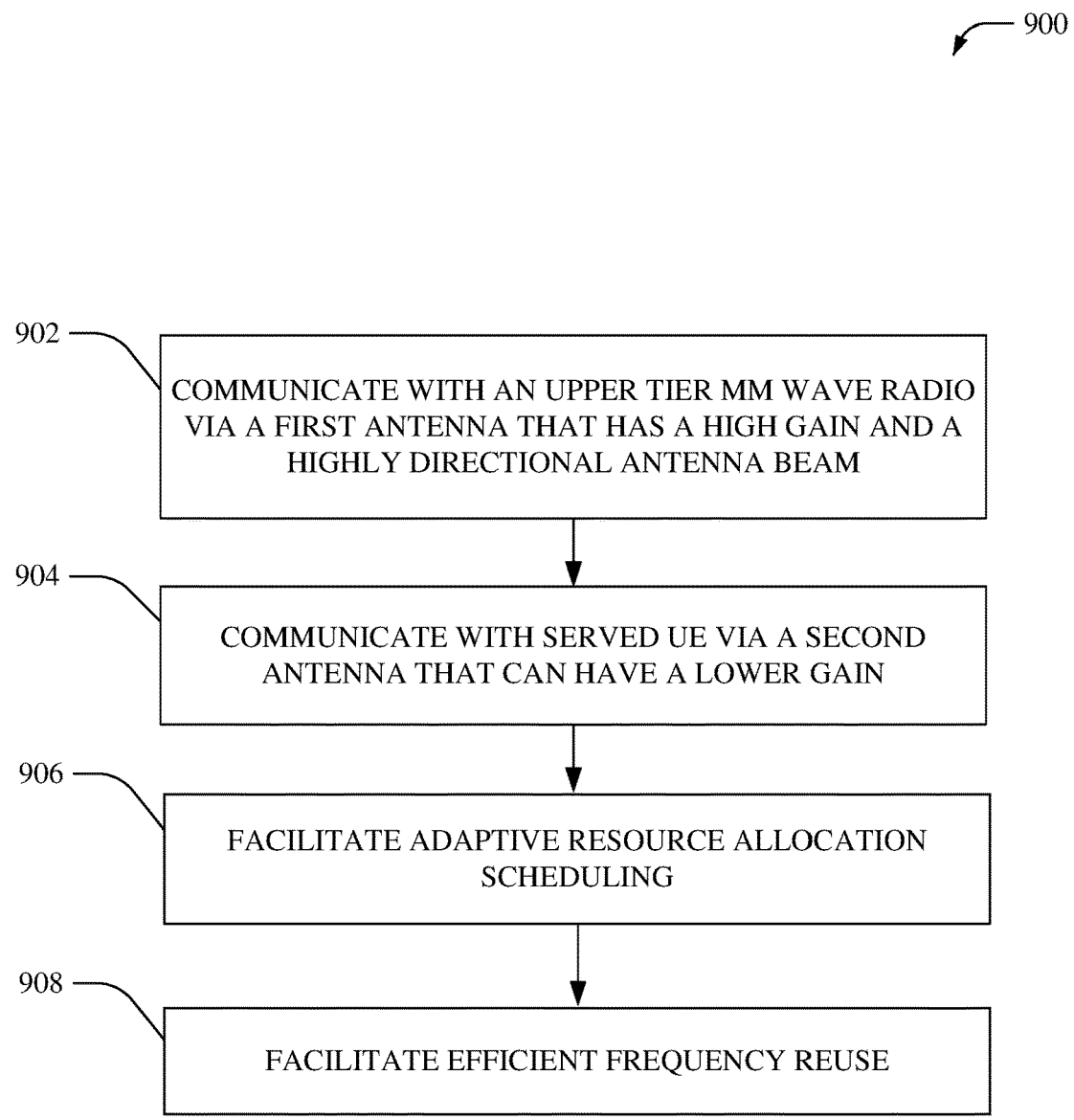
FIG. 9 illustrates an example method that facilitates communication via tiered mmWave cells.

FIG. 9 illustrates an example method 900 that facilitates communication via tiered mmWave cells, according to an aspect of the subject disclosure. As an example, method 900 can be implemented by one or more network devices (e.g., IAFHN) of a communication network (e.g., cellular network). At 902, communication with an upper tier mmWave radio can be performed via a first antenna that has a high gain (e.g., 21 dBi) and a highly directional beam (e.g., 10-15° horizontal bean width). Further, at 904, communication with a served UE can be performed via a second antenna that has a narrow beam width and typical gain (e.g., 17 dBi).

At 906, adaptive resource allocation scheduling can be facilitated. For example, RBs can be allocated based on parameters, such as, but not limited to traffic demand, QoS targets, RF condition on the IAFHN to meet a SLA, etc. Further, at 908, efficient frequency reuse can be facilitated. In one example, frequency utilization data can be exchanged between cells to plan optimal frequency reuse that reduces conceivable co-channel interference.

Figure 10:
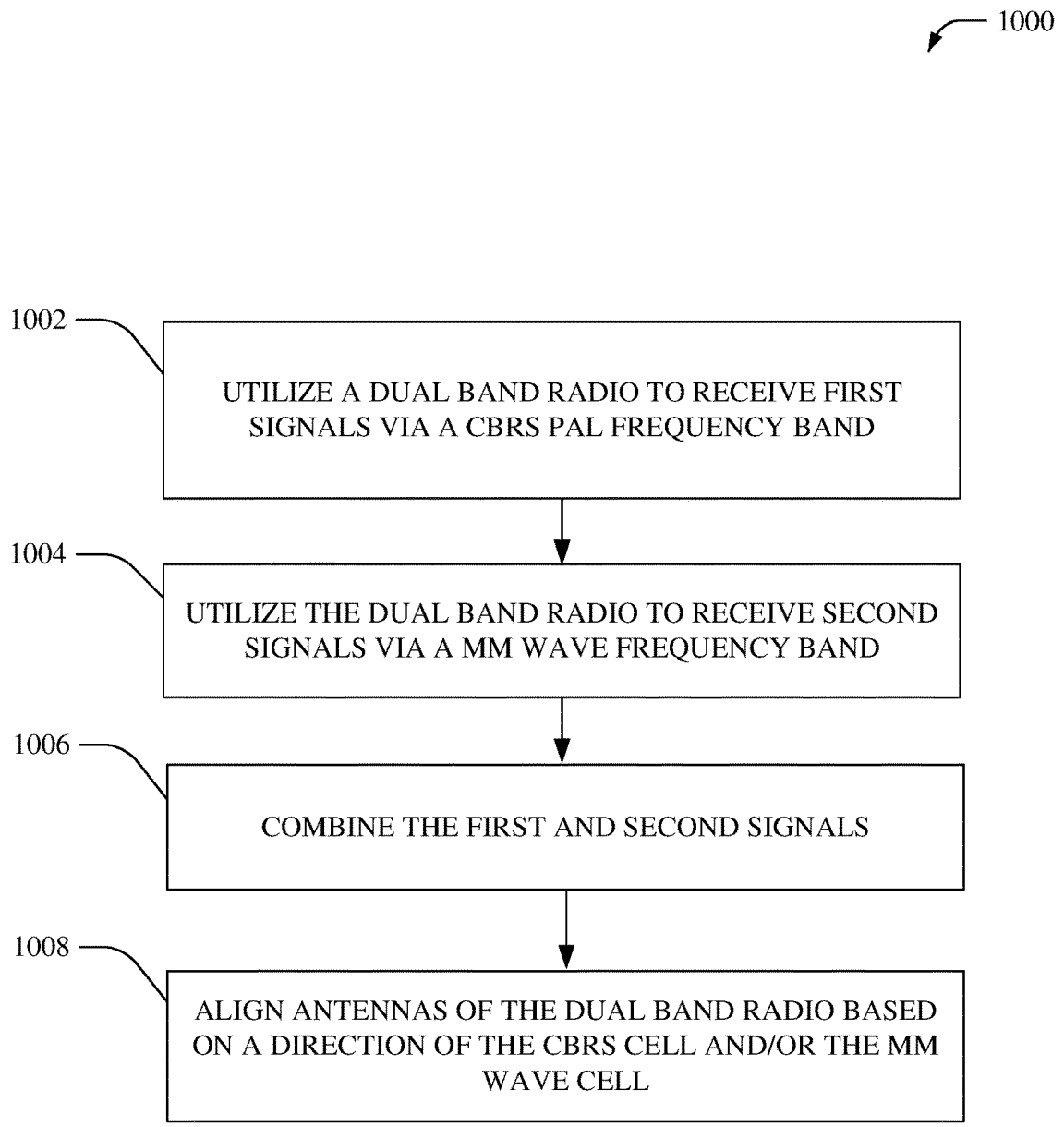
FIG. 10 illustrates an example method that facilitates DC within a deployment scheme that overlays mmWave on CBRS coverage.

FIG. 10 illustrates an example method 1000 that facilitates DC within a deployment scheme that overlays mmWave on CBRS coverage, according to an aspect of the subject disclosure. As an example, method 1000 can be implemented by one or more UEs (e.g., fixed and/or nomadic UEs) of a communication network (e.g., cellular network). At 1002, a dual band radio can be utilized to receive first signals via a CBRS PAL frequency band (e.g., broadcast by a CBRS cell). At 1004, the dual band radio can be utilized to receive second signals via a mmWave frequency band (e.g., broadcast by a mmWave cell). Moreover, at 1006, the first and second signals can be combined. Accordingly, the DL throughput can be greater than (or equal to) 1 GB/sec.

Further, at 1008, the antennas of the dual band radio can be aligned based on a direction of the CBRS cell and/or the mmWave cell. As an example, the alignment can be performed periodically, in response to an event, on-demand, at a specified time, etc. In an aspect, the dual band radio comprises a cylindrical-shaped and/or other shaped (e.g., a flexible form factor antenna that matches installation site characteristics), self-aligning antenna that can have multiple panel antennas that can be steered to point to a direction of a stronger signals in two different bands. For example, the multiple panel antennas can point towards the mmWave cell in one direction and towards the CBRS cell in another direction.

Figure 11:
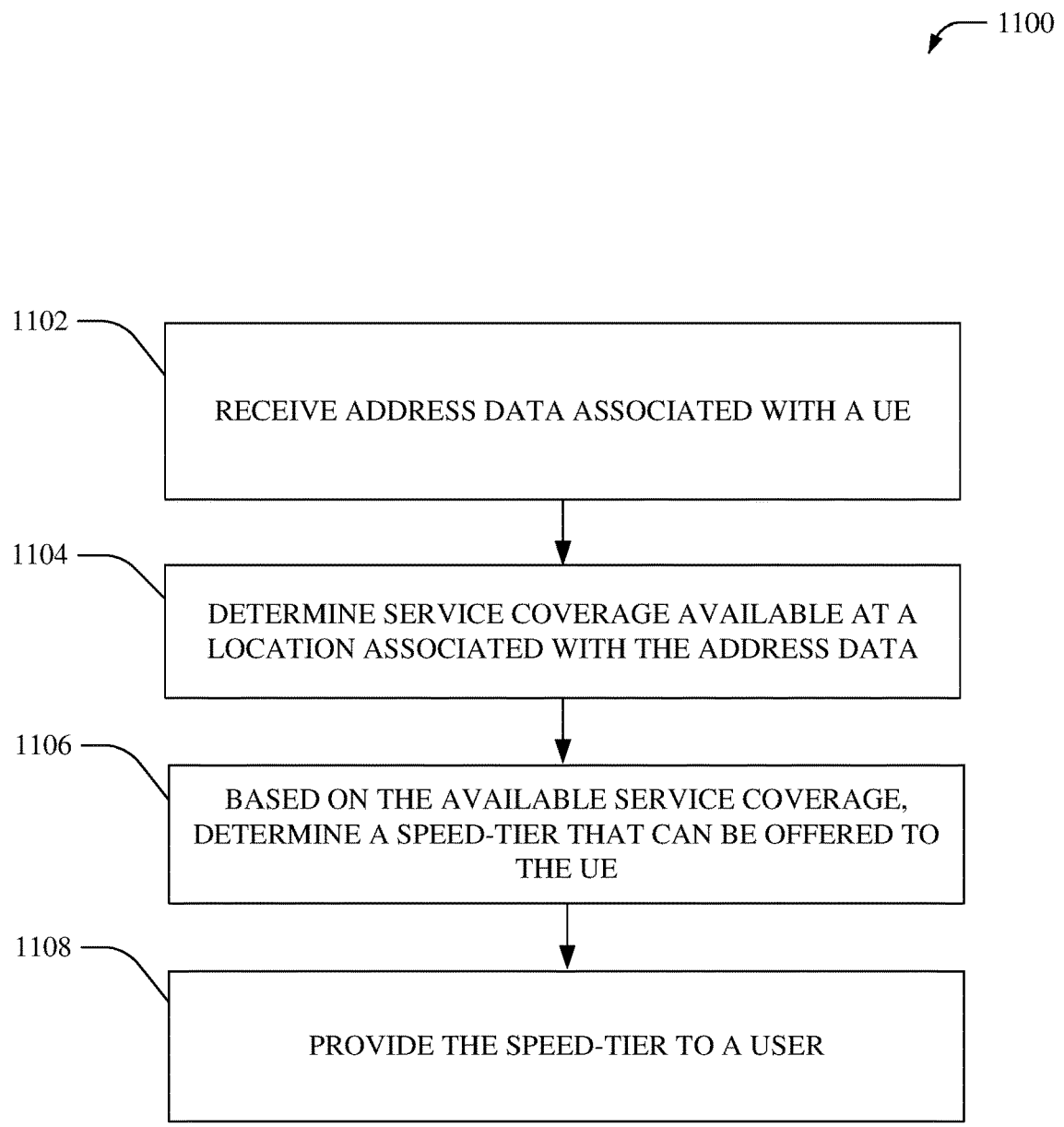
FIG. 11 illustrates an example method for offering different tiers of service to a user.

FIG. 11 illustrates an example method 1100 for offering different tiers of service to a user, according to an aspect of the subject disclosure. As an example, method 1100 can be implemented by one or more network devices (e.g., a provisioning server) of a communication network (e.g., cellular network). At 1102, address data associated with a UE can be received. For example, a geographical location/area at which a user is planning to utilize a fixed (and/or nomadic) UE can be received (e.g., during registration and/or service initiation). At 1104, service coverage available at a location associated with the address data can be determined. For example, it can be verified that only CBRS coverage is available at the location, only mmWave coverage is available at the location, or both CBRS and mmWave coverage is available at the location. At 1106, based on the available service coverage, a speed-tier that can be offered to the UE can be determined. For example, if determined that only CBRS coverage is available at the location, a first speed tier can be offered; if determined that only mmWave coverage is available at the location, a second speed tier can be offered; and if determined that both CBRS and mmWave coverage is available at the location, a third speed tier can be offered (e.g., wherein the first speed is lower than the second speed, which is lower than the third speed). Typically, the different speed-tiers can be offered at different fees (e.g., higher fees can be charged for higher speeds). Moreover, at 1108, the speed-tier can be provided to a user of the UE. As an example, based on the offered service tier, the user can select whether a UE with a single-mode or dual-mode receiver can be utilized at the location.

Figure 12:
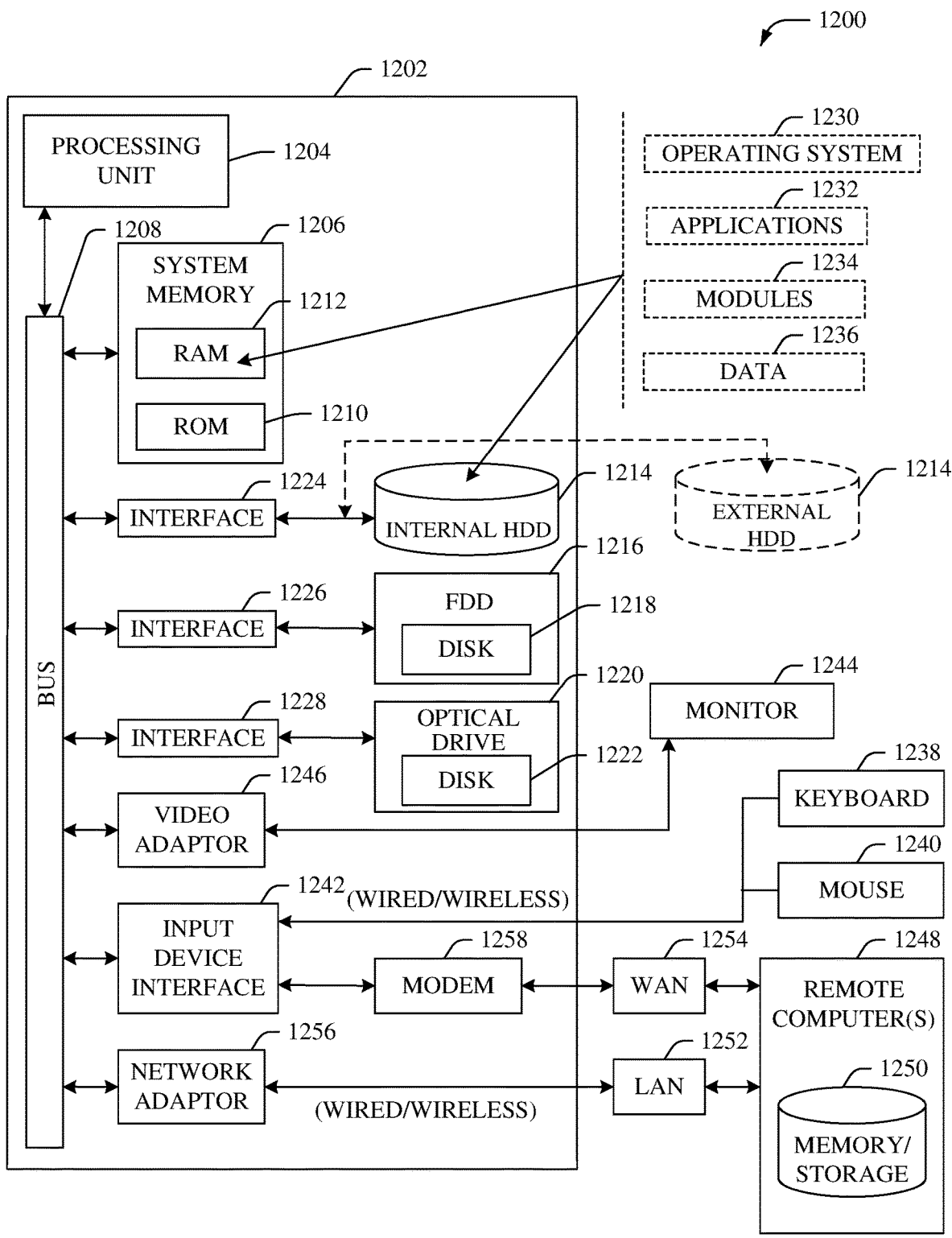
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, applications (e.g., program modules) comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media. Combinations of the any of the above should also be included within the scope of computer-readable media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), application(s) server(s), equipment, system(s), interface(s), gateway(s), controller(s), node(s), entity(ies), function(s), cloud(s), access point(s), and/or device(s) (e.g., AP 102, UEs $110_1$-$110_{11}$, IAFHNs $106_1$, $106_2$, $106_3$, $106_{11}$, $106_{21}$, $106_{31}$, $106_{12}$, $106_{13}$, $106_{14}$, $106_{22}$, $106_{23}$, $106_{24}$, $106_{32}$, $106_{33}$, $106_{34}$, and/or 202, antenna configuration component 204, data stream relay component 206, parameter reporting component 208, scheduling component 304, frequency reuse component 306, gNB 1 $402_1$, gNB 2 $402_2$, frequency reuse components $306_1$-$306_2$, cells $502_1$-$502_6$, DC UE 602, alignment component 606, provisioning component 702, qualification determination component 706, etc.) disclosed herein with respect to systems 100-700 can each comprise at least a portion of the computer 1202. The system bus 1208 couples system components comprising, but not limited to, the system memory 1206 to the processing unit 1204. The processing unit 1204 can be any of various commercially available processors. Dual microprocessors and other multiprocessor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is noted that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an infrared (IR) interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless access point disposed thereon for communicating with the wireless adapter 1256.

When used in a WAN networking environment, the computer 1202 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be noted that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
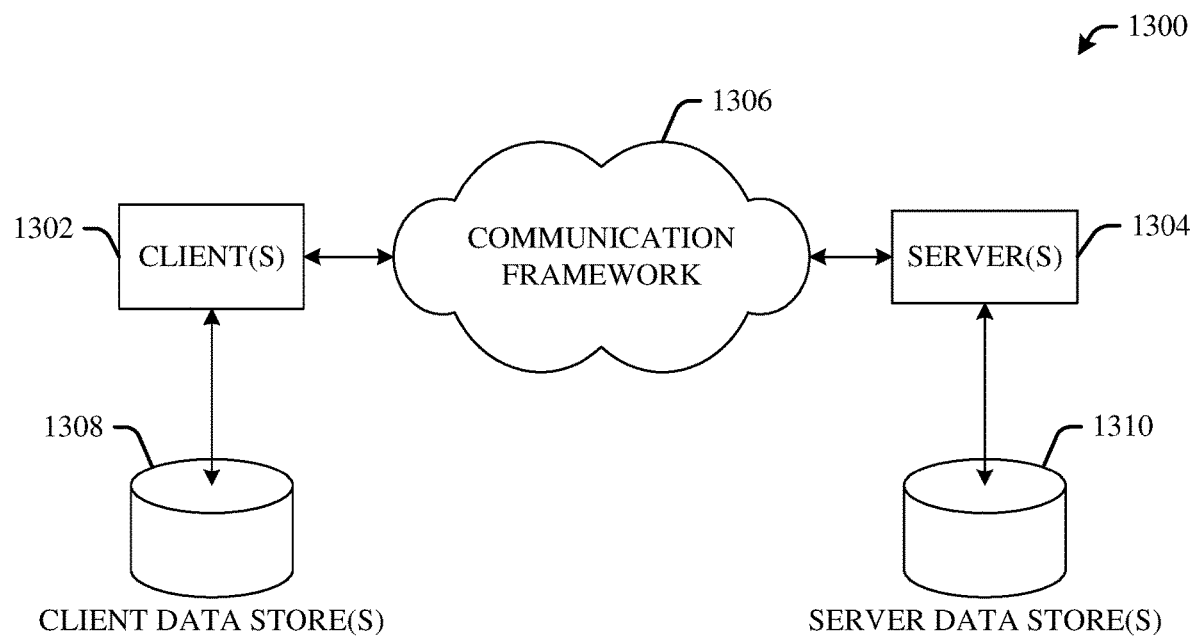
FIG. 13 illustrates a schematic block diagram of a computing environment in accordance with the subject specification.

Referring now to FIG. 13, there is illustrated a schematic block diagram of a computing environment 1300 in accordance with the subject specification. The system 1300 comprises one or more client(s) 1302. The client(s) 1302 can be hardware and/or software (e.g., threads, processes, computing devices).

The system 1300 also comprises one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may comprise a cookie and/or associated contextual information, for example. The system 1300 comprises a communication framework 1306 (e.g., a global communication network such as the Internet, cellular network, etc.) that can be employed to facilitate communications between the client(s) 1302 and the server(s) 1304.

Communications can be facilitated via a wired (comprising optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
facilitating a backhaul transmission between a first millimeter wave radio, of a group of tiered millimeter wave radios, and a second millimeter wave radio, of the group of tiered millimeter wave radios, via a first antenna that is configured to have a first gain;
facilitating a first non-backhaul transmission to a dual band user equipment via a citizens broadband radio service radio upon which a millimeter wave network coverage generated via the group of tiered millimeter wave radios is overlaid, wherein the first non-backhaul transmission is transmitted via a priority access license frequency band of a citizens broadband radio service spectrum, and wherein antennas of the dual band user equipment have been aligned based on a first location of the citizens broadband radio service radio and a second location of the first millimeter wave radio;
facilitating a second non-backhaul transmission between the first millimeter wave radio and the dual band user equipment via a second antenna configured to have a second gain, and wherein the first gain is higher than the second gain; and
performing adaptive resource allocation for millimeter wave transmissions based on traffic demand information associated with the group of tiered millimeter wave radios.

2. The system of claim 1, wherein the operations further comprise:
directing, to a macro access point device according to a fifth generation network protocol, frequency utilization data that is indicative of frequency bands utilized by a third millimeter wave radio of the group of tiered millimeter wave radios.

3. The system of claim 2, wherein the directing comprises directing the frequency utilization data via an Xn interface.

4. The system of claim 1, wherein the first gain satisfies a high gain criterion that is defined to generate a directional antenna beam that provides a wireless backhaul link.

5. The system of claim 4, wherein the first antenna points in a direction of a third millimeter wave radio within a first tier of the group of tiered millimeter wave radios, and wherein the first millimeter wave radio is within a second tier of the group of tiered millimeter wave radios.

6. The system of claim 1, wherein the operations further comprise:
receiving address data indicative of an area in which a user equipment is to be utilized; and
based on an analysis of a citizens broadband radio service network coverage area of the citizens broadband radio service radio upon which millimeter wave network coverage generated via the group of tiered millimeter wave radios is overlaid and a millimeter wave network coverage area, determining speed-tier data indicative of a downlink data throughput that is able to be provided to the user equipment within the area.

7. The system of claim 1, wherein the performing is based on radio frequency condition data associated with the group of tiered millimeter wave radios.

8. The system of claim 1, wherein
the group of tiered millimeter wave radios are configured in an integrated access and backhaul chain that utilize the backhaul resources.

9. A method, comprising:
facilitating, by a system comprising a processor, a backhaul transmission between a first millimeter wave radio, which is one of multiple millimeter wave radios, and a second millimeter wave radio, which is a different one of the multiple millimeter wave radios, via a first antenna that is configured to have a first gain;
facilitating, by the system, a first non-backhaul transmission to a dual band user equipment via a citizens broadband radio service radio upon which a millimeter wave network coverage generated via the group of tiered millimeter wave radios is overlaid, wherein the first non-backhaul transmission is transmitted via a priority access license frequency band of a citizens broadband radio service spectrum, and wherein antennas of the dual band user equipment have been aligned based on a first location of the citizens broadband radio service radio and a second location of the first millimeter wave radio;
facilitating, by the system, a second non-backhaul transmission between the first millimeter wave radio and the dual band user equipment via a second antenna that is configured to have a second gain, wherein the first gain is higher than the second gain; and
performing, by the system, adaptive resource allocation for the backhaul transmission and the non-backhaul transmission.

10. The method of claim 9, wherein the performing comprises:
determining an allocation of resource blocks based on service level agreement data representative of a service level agreement, and according to a fifth generation network protocol.

11. The method of claim 9, wherein the performing comprises:
determining an allocation of resource blocks based on radio frequency condition data associated with a third millimeter wave radio, of the multiple millimeter wave radios, different than the first millimeter wave radio and the second millimeter wave radio.

12. The method of claim 9, wherein the performing comprises:
   determining an allocation of resource blocks based on quality of service data representative of a defined quality of service.

13. The method of claim 9, further comprising:
   facilitating, by the system, receiving report data indicative of attributes of a third millimeter wave radio, of the multiple millimeter wave radios, different than the first millimeter wave radio and the second millimeter wave radio; and
   based on the report data, determining, by the system, a distribution of millimeter wave spectrum among the multiple millimeter wave radios.

14. A non-transitory machine-readable medium, comprising executable instructions that, when executed by a processor of network equipment, facilitate performance of operations, comprising:
   facilitating a backhaul communication between a first millimeter wave radio and a second millimeter wave radio via a first antenna that is configured with a first gain that satisfies a high gain criterion;
   facilitating a first non-backhaul communication to a dual band user equipment via a citizens broadband radio service radio upon which a millimeter wave network coverage generated via the group of tiered millimeter wave radios is overlaid, wherein the first non-backhaul transmission is transmitted via a priority access license frequency band of a citizens broadband radio service spectrum, and wherein antennas of the dual band user equipment have been aligned based on a first location of the citizens broadband radio service radio and a second location of the first millimeter wave radio;
   facilitating a second non-backhaul communication from the first millimeter wave radio to the dual band user equipment via a second antenna that is configured with a second gain that does not satisfy the high gain criterion; and
   performing adaptive resource allocation to schedule resource blocks of the signals.

15. The non-transitory machine-readable medium of claim 14, wherein the operations further comprise:
   aligning the first antenna in a first direction towards the second millimeter wave radio; and
   aligning the second antenna in a second direction towards a defined area to serve the user equipment.

16. The non-transitory machine-readable medium of claim 14, wherein the operations further comprise:
   determining report data indicative of attributes of the network equipment, according to a fifth generation network protocol; and
   transferring the report data to the second millimeter wave radio to facilitate a distribution of millimeter wave spectrum among millimeter wave radios, comprising the first millimeter wave radio and the second millimeter wave radio.

17. The non-transitory machine-readable medium of claim 16, wherein the report data comprises sector configuration data associated with the network equipment.

18. The non-transitory machine-readable medium of claim 14, wherein the operations further comprise:
   directing, to a macro access point device according to a fifth generation network protocol, frequency utilization data that is indicative of frequency bands utilized by a third millimeter wave radio of the group of tiered millimeter wave radios.

19. The non-transitory machine-readable medium of claim 18, wherein the directing comprises directing the frequency utilization data via an Xn interface.

20. The non-transitory machine-readable medium of claim 18, wherein the first gain satisfies a high gain criterion that is defined to generate a directional antenna beam that provides a wireless backhaul link.

* * * * *